April 30, 1968           J. TORRES           3,380,476
FLUID COUPLING WITH VACUUM ASSISTED VALVE ELEMENTS
Filed April 3, 1964           3 Sheets-Sheet 1
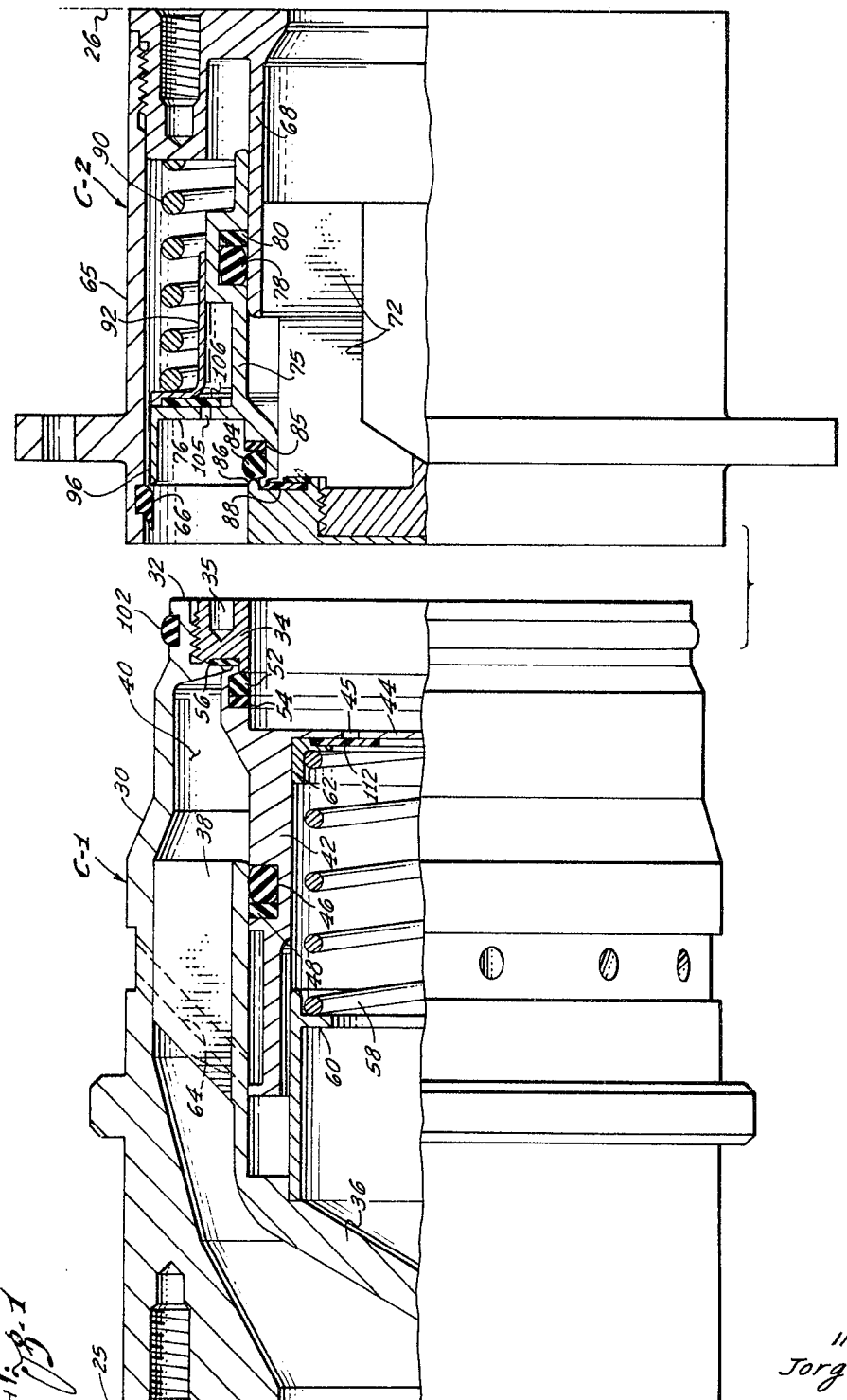
INVENTOR:
Jorge Torres
By Smyth, Roston & Pavitt
Attorneys

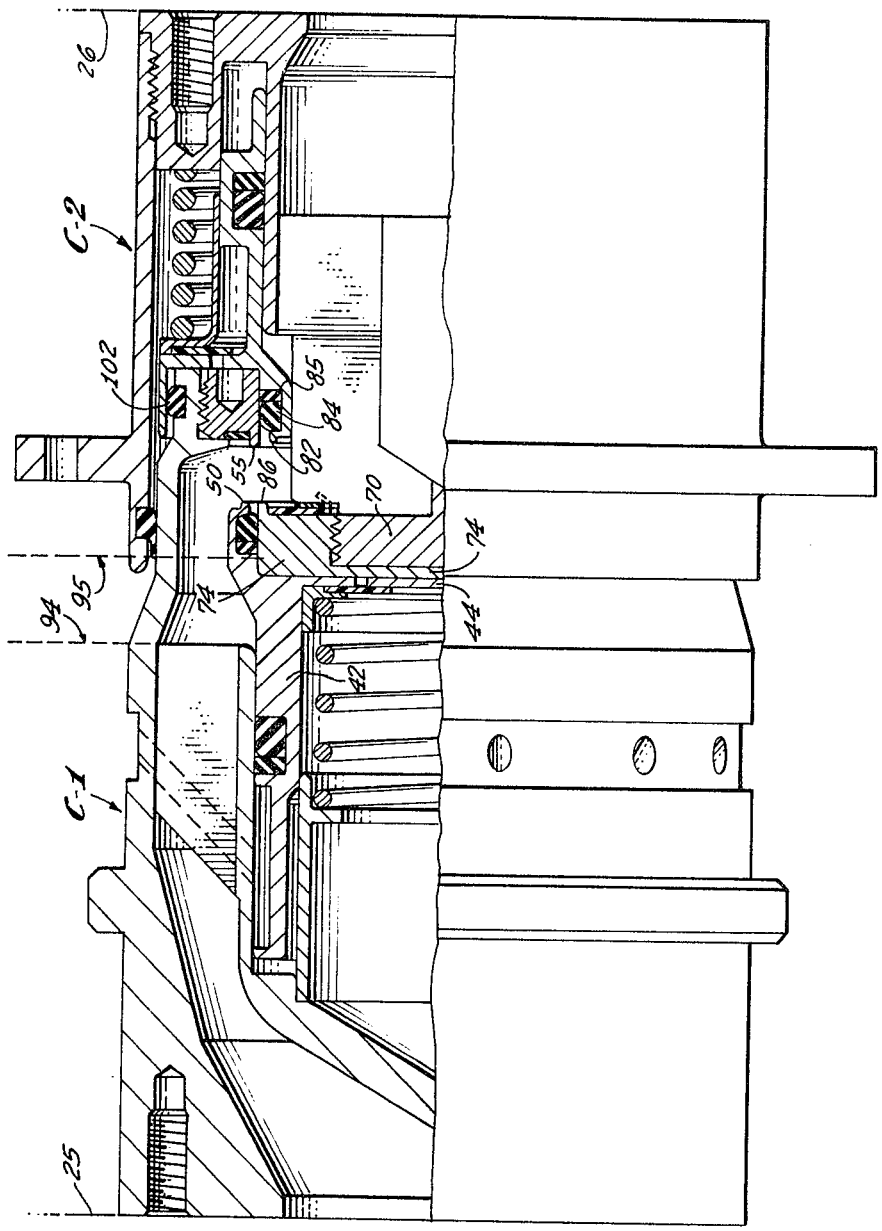

April 30, 1968  J. TORRES  3,380,476
FLUID COUPLING WITH VACUUM ASSISTED VALVE ELEMENTS
Filed April 3, 1964  3 Sheets-Sheet 3
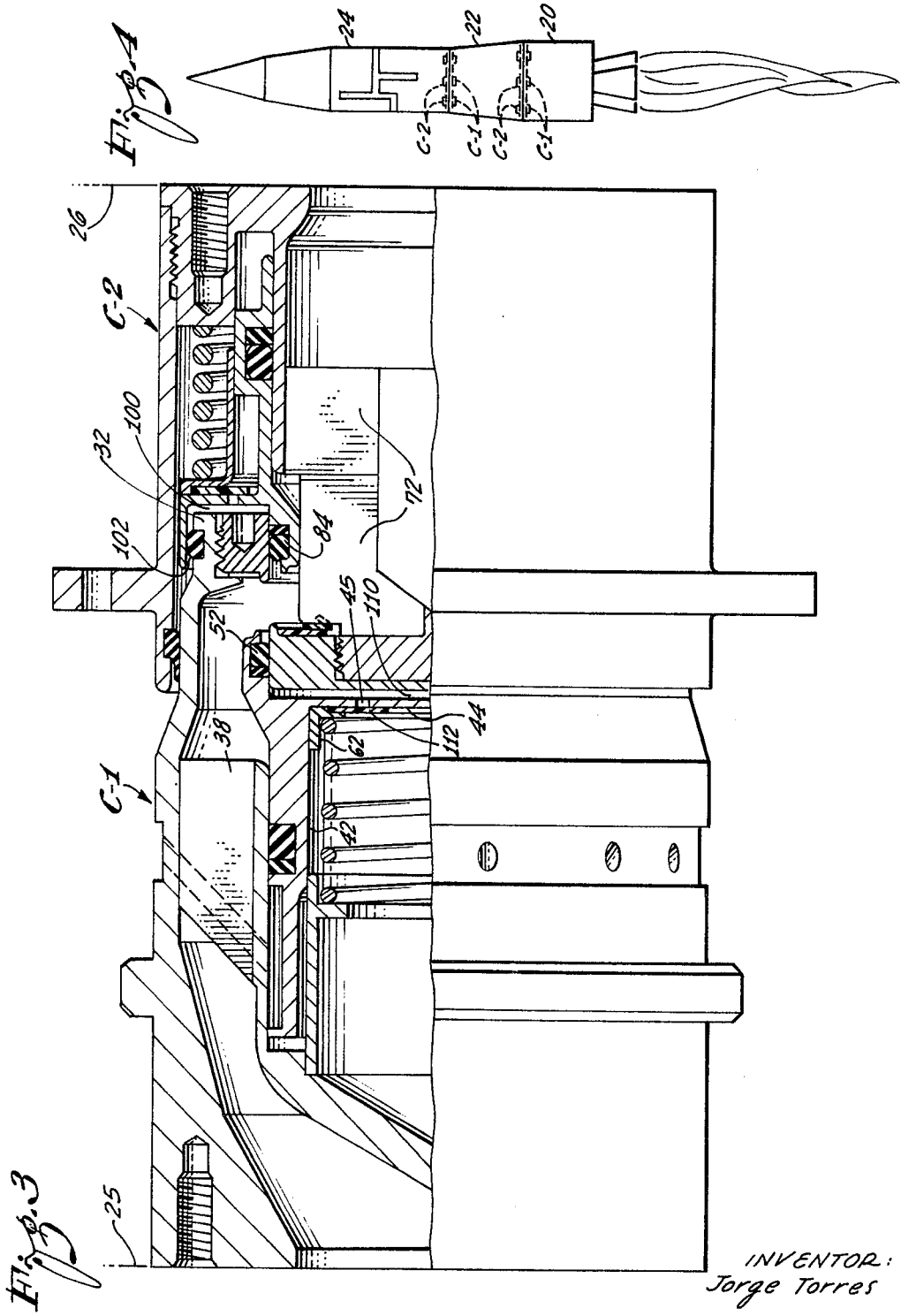
INVENTOR:
Jorge Torres
Attorneys

United States Patent Office 3,380,476
Patented Apr. 30, 1968

3,380,476
FLUID COUPLING WITH VACUUM ASSISTED
VALVE ELEMENTS
Jorge Torres, Los Angeles, Calif., assignor to Purolator
Products, Inc., Rahway, N.J., a corporation of Delaware
Filed Apr. 3, 1964, Ser. No. 357,244
10 Claims. (Cl. 137—614.05)

This invention relates to a coupling assembly for interconnecting two passage members for flow therethrough of fluid under high pressure. More particularly, the invention pertains to a quick disconnect coupling of the type in which two complementary coupling bodies join telescopically and at least one of the two coupling bodies is equipped with a valve to confine fluid therein and the other of the two coupling bodies abuts the valve to open the valve in response to mating of the coupling bodies.

While the invention is broadly applicable for its purpose, it has special utility in an arrangement of a plurality of balanced couplings wherein a first plurality of coupling bodies is carried by a first structure, a second corresponding plurality of complementary coupling bodies is carried by a second structure, and the two structures are releasably interconnected to hold the telescoped pairs of coupling bodies together. Such an arrangement is useful for releasably interconnecting two stages of a rocket.

The so-called balanced couplings balance or cancel out the usual fluid pressures that tend to separate the mated coupling bodies and thus completely eliminate high magnitude fluid pressure separation forces. The elimination of the fluid pressure separation forces makes it a practical matter to depend on latches interconnecting the two structures to hold the mated coupling bodies together.

By way of example and to illustrate the principles involved, the present disclosure is directed to a coupling construction adapted for the described arrangement of a plurality of balanced couplings. It is to be understood, however, that the invention may be embodied in other arrangements and in couplings that are not balanced.

The invention meets a certain problem relating to the use of springs to bias two valves in the two complementary coupling bodies respectively to closed positions, which springs are overcome when the telescoping of the two bodies retracts the two valves to open positions. A dilemma arises in that the valve springs should be relatively strong to keep the valves from sticking in open position but if the springs are strong enough for high reliability manual force of relatively high magnitude must be used against the springs to telescope the coupling bodies together. Where a number of complementary coupling bodies are carried on two cooperating structures, respectively, the use of high strength valve springs for reliability creates an excessive total spring force to resist joining of the coupling bodies.

One answer to this problem found in the prior art is to provide automatic latch means for temporarily connecting each valve to the opposite coupling body that retracts the valve. Thus when the two coupling bodies are disconnected and pulled apart, each coupling body is temporarily automatically connected to the valve in the other coupling body to pull the valve to closed position. The two valves close while the two coupling bodies are still in telescoped relation and thereby avoid any substantial spillage of the fluid. As the two coupling bodies approach complete separation the latches release automatically to free each coupling body from the valve in the other coupling body.

Such a prior art arrangement has two disadvantages. In the first place, latch mechanisms which will engage automatically when the two coupling bodies are telescoped together and will disengage automatically with proper timing when the two coupling bodies are separated, are complicated mechanisms that not only increase the cost of a coupling assembly but also lessen the reliability of the assembly. In the second place, the two latch mechanisms substantially increase the weight of the coupling assembly and in most instances it is exceedingly important to keep the weight as low as possible.

Another prior art arrangement employs permanent magnets instead of latches to connect the coupling bodies temporarily to the valves. The disadvantage of this second arrangement is that strong magnets must be employed to insure reliability and such magnets add substantial weight as well as substantial cost.

The present invention meets the same problem by employing suction cups to interconnect a coupling body and a valve member pneumatically, a suction effect being utilized to pull the valve member to its closed position as the two coupling bodies separate.

This solution to the problem adds neither appreciable weight nor appreciable cost because only simple structural modifications are involved. It is merely necessary to so shape the cooperating valve body and valve member to telescope together in such manner as to form a suction chamber that is collapsed as the coupling of the two bodies is completed and that expands in response to the initial separation movement of the two coupling bodies. To carry out this concept it is essential that air be expelled from the suction chamber when the chamber collapses but that no air be admitted when the suction chamber is initially expanded by the initial separation movement of the two coupling bodies.

In the particular embodiment of the invention that has been selected for the present disclosure, one of the coupling body and the cooperating valve member is shaped both to telescope over the outside circumference and to telescope into the inside circumference of the other of the coupling body and the cooperating valve member to cooperate therewith to form the required suction chamber. Suitable elastomeric sealing rings are provided between the telescoping surfaces and the resulting suction chamber is provided with a vent port to the atmosphere with the vent port under the control of a check valve. A feature of the invention is that the check valve may be a simple flapper type valve of insignificant cost and weight.

The features and advantages of the invention may be understood from the following detailed description and the accompanying drawings.

In the drawings, which are to be regarded as merely illustrative:

FIG. 1 is a view partly in side elevation and partly in longitudinal section showing a pair of complementary coupling bodies embodying a selected practice of the invention, the two coupling bodies being shown as separated and poised for engagement with each other;

FIG. 2 is a similar view showing the two coupling bodies telescoped together for fluid flow therethrough;

FIG. 3 is a similar view illustrating an early stage in the separation of the two coupling bodies; and FIG. 4 is a simplified side elevational view of a rocket with separable stages to illustrate a typical use of the invention.

FIG. 4 shows a rocket having a first stage 20, a second stage 22 and a third stage 24. A number of passages for conducting pressurized fluid extend from the third stage 24 to the second stage 22 and extend from the second stage to the first stage 20. For each of these passages from one stage to the other there is a pair of cooperating coupling bodies mounted on the respective stages. In FIG. 4 the pairs of coupling bodies are indicated in dotted lines, each pair comprising a coupling body C–1 on one stage of the rocket and a cooperating coupling body C–2 on the adjacent stage.

The two cooperating coupling bodies C–1 and C–2 of each pair merely telescope together without latching with each other. Thus all of the pairs of cooperating coupling bodies C–1 and C–2 between two of the stages of the rocket are held together solely by the releasable means that mechanically connects the two stages together. Each of the pairs of coupling bodies and the valve mechanisms therein are so constructed as to avoid the creation of any fluid pressure separation force. Thus the releasable means that are employed for mechanically interconnecting the successive stages of the rocket are free from any loading arising from the pressure of the fluids that pass through the plurality of pairs of coupling bodies.

FIGS. 1 to 3 illustrate an embodiment of the invention that may be employed for each pair of coupling means C–1 and C–2 in the rocket shown in FIG. 4. These figures show a coupling body C–1 mounted in a support structure 25 and a cooperating coupling body C–2 mounted in a support structure 26, suitable latch means (not shown) being provided to interconnect the two support structures thereby to interconnect the two coupling bodies.

Referring to FIG. 1, the first coupling body, generally designated C–1, has an outer cylindrical wall 30 with a forward rim 32 that is formed in part by a valve retainer in the form of a threaded ring 34, the ring having circumferentially spaced blind bores 35 for rotation by a suitable spanner. The coupling body C–1 is further provided with a cup-shaped inner wall 36 that is integrally connected with the outer cylindrical wall 30 by a plurality of circumferential spaced radial fins 38. The two walls 30 and 36 form an annular passage 40 which is normally closed by a sleeve valve 42, the sleeve valve having a forward transverse end wall 44 with at least one vent port 45 therein.

The sleeve valve 42 is slidingly telescoped into the cup-shaped wall 36 and the sliding joint is sealed by an O-ring 46 and a cooperating back-up ring 48 both carried by the sleeve valve. The forward end of the sleeve valve 42 forms a circumferential lip 50 (FIG. 2) and carries an O-ring 52 together with a cooperating back-up ring 54.

In like manner the valve retainer ring 34 is formed with a rearwardly directed circumferential lip 55 (FIG. 2) and the retainer ring carries a forward face seal 56. When the sleeve valve 42 is closed as shown in FIG. 1 the lip 50 of the sleeve valve presses against the face seal 56 and at the same time the lip 55 of the retainer ring presses against the O-ring 52 to provide the required sealing action for the closed valve.

The sleeve valve 42 is urged towards its forward closed position by a coil spring 58 which acts under compression between a cylindrical spring guide 60 and a forward spring seat 62 that presses against the transverse end wall 44 of the sleeve valve.

It is apparent in FIG. 1 that the cup-shaped sleeve valve 42 cooperates with the cup-shaped wall 36 of the first coupling body C–1 to form a chamber. This chamber is vented to the atmosphere by a plurality of vent passages 64 through the radial fins 38.

The second cooperating body C–2 has an outer cylindrical wall 65 dimensioned to telescope over the outer cylindrical wall 30 of the first coupling body and preferably this outer cylindrical wall is provided with an elastomeric wiper ring 66 to remove foreign material from its path. A short inner cylindrical wall 68 is fixedly united with the outer cylindrical wall 65 and a transverse nose portion 70 of the valve body C–2 is united with the inner cylindrical wall by a circumferential series of radial fins 72. Threaded onto the nose portion 70 to serve as a part thereof is a suitable valve retainer in the form of a threaded retainer cap 74.

A sleeve valve 75 having an outwardly radial wall 76 is slidingly telescoped over the inner cylindrical wall 68 with the sliding joint sealed by an O-ring 78 and a cooperating back-up ring 80 carried by the sleeve valve. The sleeve valve 75 is formed with a forward circumferential lip 82 (FIG. 2) and the forward end of the sleeve valve carries an outer O-ring 84 together with a cooperating back-up ring 85. In like manner the valve retainer ring 74 is formed with a rearwardly directed circumferential lip 86 (FIG. 2) and carries a forward face seal 88.

The sleeve valve 75 is urged towards its closed position by a coil spring 90 that acts against a spring seat 92 which, in turn, presses against the radial wall 76 of the sleeve valve. At the closed position of the sleeve valve 75 shown in FIG. 1 the lip 86 of the retainer ring 74 presses against the O-ring 84 and the lip 82 of the sleeve valve presses against the face seal 88.

When the two coupling bodies C–1 and C–2 are aligned with each other as shown in FIG. 1 and then are moved together into coupled relation as shown in FIG. 2, the rim 32 of the first coupling body C–1 encounters and retracts the sleeve valve 75 to open position in opposition to the spring 90 and at the same time the nose portion 70 of the second valve body C–2 encounters the sleeve valve 42 and retracts it to its open position in opposition to the spring 58. With the two sleeve valves 42 and 75 retracted, a continuous flow passage is formed through the two coupling bodies as shown in FIG. 2.

When the two coupling bodies are held together as shown in FIG. 2 by means (not shown) releasably interconnecting the two support structures 25 and 26, all of the fluid pressures outside of the outside diameter of the nose portion 70, i.e. outside of the outside diameter of the retainer cap 74, are balanced for the elimination of fluid separation forces in this outer radial zone. Thus on each side of a transverse plane indicated by the dotted line 94 in FIG. 2 the effective transverse areas of the coupling body C–1 outside of the diameter of the retainer cap 74 that are subjected to fluid pressures in the opposite axial directions are equal and cancel out. In like manner in the region outside of the diameter of the retainer cap 74 and along the transverse plane indicated by the dotted line 95, the opposite effective transverse surfaces of the sleeve valve 42 that are subjected to fluid pressure are equal to cancel out the opposed pressures. Thus no separation force created by fluid pressure exists in the outer radial zone.

In the remaining central or inner radial zone the outside diameter of which is the outside diameter of the retainer cap 74, no trapped fluid can exist under high pressure to create separation force because the space between the retainer cap or nose portion 70 of the second coupling body C–2 and the sleeve valve 42 is vented to the chamber that is formed by the sleeve valve 42 and the cup-shaped body wall 36 and this chamber in turn is vented to the atmosphere by vent passages 64.

In general, the structure described to this point is broadly old in the art. The improvement provided by the present invention consist of a suction cup to pneumatically couple the rim 32 of the first coupling body C–1 with the sleeve valve 75 to pull the sleeve valve to closed position when the two coupling bodies are separated and the provision of a second suction cup to pneumatically couple the nose portion 70 of the second coupling body C–2 with the sleeve valve 42 to pull the sleeve valve 42 to closed position when the two coupling bodies separate. Various types of suction cups may be provided for this purpose in various practices of the invention. The specific suction cups incorporated in the present embodiment of the invention will now be described.

The outwardly radial wall 76 of the sleeve valve 75 is provided with a cylindrical flange 96 that is dimensioned to telescope over the rim 32 of the first coupling body C–1 and since the forward portion of the sleeve valve 75 is dimensioned to telescope into the rim 32, the sleeve valve and the rim cooperate to form a suction chamber when the two telescope together, the suction chamber being designated 100 in FIG. 3. This suction chamber 100 is sealed by an outer O-ring 102 that embraces the rim 32 of the first coupling body C–1 and is further sealed by the previously mentioned O-ring 84 that is carried by the sleeve valve 75.

The suction chamber 100 is vented to the atmosphere by means of at least one port 105 in the radial wall 76 of the sleeve valve 75. There may be any desired number of such ports all on the same circumference. A check valve to prevent flow of atmospheric air into the suction chamber 100 is preferably a flap valve in the form of a flat flexible elastomeric ring 106 that is held against the rear face of the radial wall 76 by the pressure of the previously mentioned spring seat 90.

The forward end of the sleeve valve 42 is dimensioned to telescope over the nose portion 70 of the second coupling body C–2, i.e. to telescope over the outside circumference of the valve retainer cap 74. When the sleeve valve 42 telescopes over the nose portion 70 it forms a suction chamber which is designated 110 in FIG. 3. It can be seen in FIG. 3 that this suction chamber 110 is sealed by the previously mentioned O-ring 52 that is carried by the sleeve valve 42. A check valve to prevent flow of air into the chamber 110 while permitting free flow of air out of the chamber may be a flap valve in the form of a flat elastomeric ring 112 that covers the port or ports 45 and is held against the rear face of the transverse wall 44 of the sleeve valve by means of the previously mentioned spring seat 62.

It is to be noted that both the O-ring 84 of the sleeve valve 75 and the O-ring 52 of the sleeve valve 42 have dual functions in that each O-ring serves as a valve seal when the two coupling bodies are separated and serves as a seal for a corresponding suction chamber when the two coupling bodies are telescoped together.

The manner in which the two suction cups function for their purpose may be readily understood from the foregoing description. When the two coupling bodies are moved into their mutually engaged positions, the two suction chambers 100 and 110 are first formed and are then completely collapsed as shown in FIG. 2. The air displaced from the chamber 100 is expelled to the atmosphere through the port 105 with the flapper valve 106 yielding for this purpose. In like manner air displaced from the collapsed chamber 110 is discharged to the atmosphere through the port 45 with the flapper valve 112 yielding for this purpose.

When the time comes to separate the two coupling bodies C–1 and C–2, the initial separation movement causes slight expansion of the chambers 100 and 110 in the general manner indicated in FIG. 3 with consequent creation of a partial vacuum in each chamber. The partial vacuum in chamber 100 causes the sleeve valve 75 to follow the retreating rim 32 of the first coupling body C–1 until the sleeve valve reaches the nose portion 70 of coupling body C–2, and then the nose portion blocks further movement of the sleeve valve and serves as means to strip the sleeve valve from the first coupling body C–1.

In like manner, the partial vacuum formed in the chamber 110 causes the sleeve valve 42 to follow the retreating nose portion 70 of the second coupling body C–2 until the sleeve valve encounters the valve retainer ring 34 and then the valve retainer ring strips the sleeve valve 42 from the nose portion 70. In this manner both of the sleeve valves 42 and 75 are moved to completely closed positions before the two coupling bodies C–1 and C–2 completely separate, the closing action occurring early enough to prevent any significant spillage of the fluid that flows through the coupling assembly.

The force exerted by each of the two valve springs 58 and 90 may, for example, be on the order of 20 pounds and the magnitude of differential pressure created by each of the suction chambers 100 and 110 may be equivalent, for example, to an adhesive force on the order of 60 pounds. The force of the two valve springs is added to the adhesive force created by the two suction chambers to insure closing of the two sleeve valves. The force of the two valve springs is adequate to insure that the two sleeve valves will remain closed as long as the two coupling bodies are separated but the force of the two valve springs is relatively low and relatively little manual force is required to overcome the two springs to bring the two cooperating bodies into mutual engagement.

My description in specific detail of the selected embodiment of the invention will suggest various changes, substitutions and other departures from my disclosure within the spirit and scope of the appended claims.

I claim:

1. In a fluid coupling assembly wherein a first coupling body mates telescopically with a second coupling body and in doing so abuts and retracts a normally closed valve member in the second body to open position to permit fluid flow through the assembly, the improvement comprising:

said coupling body and said valve member being shaped and dimensioned to telescope together in a sliding manner to form a suction chamber that contracts as the two bodies close together and expands as the two bodies subsequently move apart; and means to seal said suction chamber against inflow of air while permitting outflow of air, whereby mating of the two coupling bodies forms and contracts the suction chamber with consequent expulsion of air therefrom and subsequent relative movement apart of the two coupling bodies creates a vacuum in the suction chamber to pneumatically couple the valve member with the first coupling body to cause the valve member to follow the first coupling body to the closed position of the valve member before the telescoping relation between the two coupling bodies is broken thereby to substantially prevent spillage of fluid from the interior of the second coupling body.

2. The improvement as set forth in claim 1 in which one of said first coupling body and said valve member is provided with two cylindrical skirts to telescope respectively over the outside circumference and inside the inner circumference of the other of said first coupling body and said valve member thereby to form the suction chamber.

3. In a fluid coupling assembly wherein a first coupling body mates telescopically with a second coupling body and in doing so abuts and retracts a normally closed valve member in the second body to open position to permit fluid flow through the assembly, the improvement comprising:

said first coupling body and the valve member being shaped and dimensioned to telescope together in a sealed slidable manner to cooperate with each other to form a suction chamber that progressively expands in response to initial progressive separation of the first coupling body and the valve member; and the provision of a check valve to permit release of air trapped in the suction chamber without permitting air to enter the chamber, whereby mating of the two coupling bodies causes the first coupling body and the valve member to form and contract the suction chamber with consequent expulsion of air therefrom through the check valve and subsequent relative movement apart of the first coupling body and the valve member expands the suction chamber to create a vacuum therein to pneumatically couple the valve member with the first coupling body to cause the valve member to follow the first coupling body to the closed position of the valve member.

4. In a fluid coupling assembly wherein a first coupling body mates telescopically with a second coupling body and in doing so retracts a spring-pressed valve member in the second body to open position to permit fluid flow through the assembly, the improvement comprising:

one of said first coupling body and said valve member being shaped to telescope over a portion of the other of said first coupling body and said valve member to form therewith a suction chamber that contracts as the first coupling body and the valve member close together;

annular sealing means cooperative with the first coupling body and the valve member to seal the telescopic joint between the first coupling body and the valve member;

a port in said suction chamber to vent the suction chamber to the atmosphere; and a check valve controlling said port to prevent inflow of air through the port, whereby engaging the two coupling bodies with each other forms and contracts the suction chamber with consequent expulsion of air through the vent port, and subsequent relative movement apart of the two coupling bodies creates a vacuum in the suction chamber to pneumatically couple the valve member with the first coupling body to cause the valve member to follow the first coupling body to the closed position of the valve member.

5. The improvement set forth in claim 4 in which said valve member is a sleeve valve member with a wall portion extending transversely of its axis and the port is in the said wall portion.

6. The improvement set forth in claim 5 in which said check valve comprises a flap valve member mounted on said transverse wall portion and normally closing the outer side of the port.

7. In a fluid coupling assembly wherein the rim of a first coupling body telescopes into a second coupling body, a first sleeve valve is retractable in the first body from a closed position to an open position, a second sleeve valve in the second body is retractable from a closed position to an open position, said rim of the first body being dimensioned to abut and retract the second sleeve valve, and a nose portion of the second body being dimensioned to abut and retract the first sleeve valve, the improvement comprising:

one of said rim and second sleeve valve being provided with an annular suction cup means to engage the other of said rim and second sleeve valve, the suction cup being provided with means forming a one way vent path to the atmosphere to release air displaced by the engagement of these parts and thereby to effect a subatmospheric pressure in the suction cup in response to withdrawal movement of these parts to cause the rim to pull the second sleeve valve to closed position when the two bodies are separated;

one of said nose portion and said first sleeve valve being provided with a second suction cup means to engage the other of said nose portion and said first sleeve valve, the suction cup being provided with means forming a one way vent path to the atmosphere to release air displaced by the engagement of these second parts and thereby to effect a subatmospheric pressure in the second suction cup in response to withdrawal movement of these second parts to cause the nose portion to pull the first sleeve valve to closed position when the two bodies are separated.

8. The improvement set forth in claim 7 in which:

each of said one way vent means incorporates a check valve.

9. In a fluid coupling assembly, the combination of:

a first coupling body;

a second coupling body adapted to mate with the first coupling body;

a sleeve valve mounted in the second coupling body to be retracted to open position by abutment with the first coupling body when the two coupling bodies are moved together;

spring means in the second coupling body urging the sleeve valve towards its closed position;

a portion of the second coupling body lying forward of the valve sleeve to serve as a stop therefor at the closed position of the sleeve valve;

and sealing means on at least one of said first coupling body and said sleeve valve;

one of said first coupling body and said sleeve valve being shaped and dimensioned to cooperate with said sealing means to telescopically engage the other to form therewith a suction cup means, the suction cup being provided with means forming a one way vent path to the atmosphere to release air displaced by the engagement of these parts and thereby to effect a subatmospheric pressure in the suction cup in response to withdrawal movement of these parts to cause the sleeve valve to follow the first coupling body to the closed position of the sleeve valve when the two coupling bodies are moved out of engagement with each other; and said sealing means including annular sealing means positioned on the sleeve valve to abut said stop portion of the second coupling body to serve as a seal for the sleeve valve when the sleeve valve is at its closed position, and to contact said first coupling body to serve as a seal for said suction cup when the sleeve valve is held in open position by the first coupling body.

10. A combination as set forth in claim 9 in which said stop portion of the second coupling body is an axial nose portion thereof.

References Cited

UNITED STATES PATENTS

| | | | |
|---|---|---|---|
| 2,553,680 | 5/1951 | Scheiwer | 137—596 |
| 2,958,544 | 11/1960 | Wurzburger | 137—614.3 |
| 3,224,728 | 12/1965 | Buseth | 137—614.3 X |

ALAN COHAN, *Primary Examiner.*

H. W. WEAKLEY, *Assistant Examiner.*